United States Patent [19]
Nimberger et al.

[11] Patent Number: 5,947,142
[45] Date of Patent: Sep. 7, 1999

[54] BREAKAWAY COUPLING

[75] Inventors: Spencer M. Nimberger, Houston; Robert Ward, Missouri City, both of Tex.

[73] Assignee: PGI International, Ltd., Houston, Tex.

[21] Appl. No.: 09/016,505

[22] Filed: Jan. 30, 1998

[51] Int. Cl.$^6$ .................................................. F16K 17/00
[52] U.S. Cl. ........................ 137/68.14; 137/1; 137/614
[58] Field of Search ............................ 137/614, 68.14, 137/1

[56] References Cited

U.S. PATENT DOCUMENTS

| | | | |
|---|---|---|---|
| 3,278,712 | 10/1966 | Tominaga | 137/614 X |
| 4,800,913 | 1/1989 | Nitzberg et al. | 137/68.14 |
| 5,209,262 | 5/1993 | Carow et al. | 137/68.14 X |
| 5,228,474 | 7/1993 | Nimberger . | |
| 5,285,807 | 2/1994 | Nitzberg | 137/68.14 |
| 5,320,133 | 6/1994 | Nimberger . | |

OTHER PUBLICATIONS

Bulletin: Pioneer Anhydrous Ammonia Coupling, by Gene Herzan, Nov. 17, 1993; 6 pgs.

*Primary Examiner*—Denise L. Ferensic
*Assistant Examiner*—Ramyar Farid
*Attorney, Agent, or Firm*—Browning Bushman

[57] ABSTRACT

Improved breakaway coupling 10, 10B includes an upstream housing 24, 24B and a downstream housing 26, 26B. A poppet 40, 40A, 40B, 40C is positioned within each respective upstream and downstream housing, and is biased by a spring 44, 44A, 44B, 44C for sealing engagement with a seating surface fixed to the respective housing. A push rod 58 maintains the upstream housing 40, 40B open when the coupling is mated. A spiral ring 72, 72B fits within a groove in both the upstream housing and the downstream housing when the coupling is mated, and is radially modified by sliding up a respective ramp surface 86, 86B when an axial pull is exerted on one of the flow lines connected to the coupling. The coupling may be easily reconnected by pressing the male housing into the female housing while the spiral ring is maintained in the groove in the female housing.

20 Claims, 4 Drawing Sheets

BREAKAWAY COUPLING

FIELD OF THE INVENTION

The present invention relates to a breakaway coupling with improved reliability and reduced service costs. More particularly, this invention relates to the breakaway coupling particularly suitable for positioning between the liquid anhydrous nurse tank and an applicator for applying the liquid anhydrous to the field. Upon separation, each coupling half is automatically sealed for retaining the liquid anhydrous in the flow lines extending to and from the coupling.

BACKGROUND OF THE INVENTION

Flow line systems which transport potentially dangerous fluids, such as anhydrous ammonia, include a separable connection for emergency interruption of the flow line which extends between a stationary vessel and a potential portable vessel. Occasionally a transport vehicle pulls away from the stationary vessel prior to disconnecting the flexible flow line, and the absence of a separable connection may otherwise cause a rupture of the fill line. The monetary loss of fluid from such a rupture is nominal compared to the risks commonly associated with the release of toxic vapors. The involuntary release of anhydrous ammonia due to a rupture of a flow line during an advertent pullaway may seriously injure the operator, causing blindness, skin burns, or loss of smell. For other potentially dangerous fluids, such as propane and liquid petroleum gas, the release of the fluid during an inadvertent pullaway may cause adverse environmental consequences to the filling station site or create a fire hazard. One type of improved breakaway connection, marketed as the TRIPOD™ connection, is disclosed in U.S. Pat. Nos. 5,228,474 and 5,320,133. The TRIPOD™ connection is particularly suitable for positioning between a stationary filling platform and a transport vehicle.

In a typical anhydrous ammonia application system, a stationary nurse tank, which may be periodically filled by the above-described transport vehicle, is attached to anhydrous ammonia applicator with a mechanical hitch. Each end of the hose which connects the nurse tank and an applicator may include a shutoff valve. A breakaway coupling is provided between the shutoff valves, and is designed so that when properly mounted and maintained it will uncouple with a pull force so as not to damage the nurse tank. The primary purpose of the breakaway coupling is both to separate or breakaway and to shut off the flow of ammonia in the event of separation of the applicator and nurse tank at the mechanical hitch.

One type of breakaway coupling used in anhydrous ammonia application systems is the PIONEER™ coupling distributed by Parker Hannifin Corporation. When uncoupled or disconnected, poppet valves in each half of the coupling are closed by respective valve springs, thereby stopping the flow of ammonia to the atmosphere. When the coupling is either fully connected or fully disconnected, a spring positions a sleeve to prevent locking balls from rising up out of their ball holes. When fully connected, the poppet valves in both coupling halves are open to allow ammonia flow. When the axial pull on the male coupling half exceeds the force of the sleeve spring, the coupling male half will pull out of the socket. The poppet valve springs then close to stop the discharge of anhydrous ammonia from the flexible flow lines.

The PIONEER™ coupling has several problems which have been widely recognized in the marketplace for years. This coupling has a high failure rate in service and, in an attempt to reduce failures, the manufacturer provides that the coupling must be inspected thoroughly before each use of the applicator. Due in part to the complexity of the device and the number of components, the manufacturer recommends that this breakaway coupling when used in anhydrous ammonia applications be replaced once it is in service for three years. This relatively short life is very costly to the user, both in terms of the replacement cost for new couplings and the costs associated with the placement of the coupling. The device suffers from problems associated with the sticky poppets, and numerous components are susceptible to dirt and corrosion. As time goes by without a disconnect, the manufacturer notes the corrosion may make the poppet valve action sticky such that the valve spring will not be able to close the valves. The manufacturer recommends the device be carefully cleaned and lubricated, but in practice the user seldom follows the manufacturer's recommendations regarding service. Due to the design of the PIONEER™ coupling, the required axial force to cause a breakaway is a function of the fluid pressure passing through the coupling, which inherently contributes to unreliability. The PIONEER™ coupling is thus more difficult to trip and requires a larger axial force to separate when fluid pressure in the coupling is high, since increased fluid pressure acts between the balls and the sleeve to increase friction which must be overcome in order for the coupling to separate.

The disadvantages of the prior art are overcome by the present invention. An improved safety disconnect is disclosed herein for use in a fluid flow system, and particularly for use between an anhydrous ammonia nurse tank and an applicator. The coupling of the present invention may be used, however, in various other applications wherein flow lines extend between containers which may purposefully or inadvertently move relative to each other, such that the coupling will automatically separate during a pullaway and trap fluid with each separated coupling half.

SUMMARY OF THE INVENTION

An improved breakaway coupling incorporates a pressure balance design. The upstream poppet is maintained open by a stem which is pressed against an end plate. The downstream poppet is forced open by the flow of fluids through the coupling. During a disconnect, the poppets automatically close in response to respective poppet biasing springs. The coupling may be configured so that the axes of each coupling half are coaxial, or may be configured so that the axis passing through the downstream coupling port is angled or offset at a selected angle with respect to the upstream coupling axis.

The coupling halves separate in response to an axial force which is sufficient to cause radial expansion of a spiral ring as it moves upward along a ramp surface. The spiral spring thus normally acts as a stop to prohibit separation, but expands and releases upon a selected axial force to allow separation. Due to the pressure balance design and the use of a spiral spring, fluid pressure within the coupling thus has no significant effect on the force required to separate the coupling, thereby increasing coupling reliability. Once separated, the coupling may be pushed together to reconnect the coupling halves without replacing the spiral spring. The coupling is easy to manufacture and, compared to the PIONEER™ coupling, has a long life and low service and maintenance cost.

It is an object of the present invention to provide a reliable breakaway coupling for separating in response to a selected axial force in the flow lines connected to the coupling.

It is also an object of this invention to provide a coupling whose halves separate in response to an axial force by moving a spiral ring up a ramp surface. Utilization of a spiral ring to expand and effect separation allows for reliable coupling separation with no significant effect due to the fluid pressure passing through the coupling.

Another object of this invention is to provide an improved breakaway coupling wherein the upstream poppet is maintained open by a connecting rod which is urged against an end plate, and wherein the downstream poppet is opened by fluid passing through the mated coupling. Springs close each poppet against the respective coupling housing when the coupling is disconnected.

It is a feature of this invention to provide an improved breakaway coupling which is particularly suitable for a use in anhydrous ammonia applications, and in particular between a nurse tank and a field applicator. In this application, the coupling has a long life and a relatively low failure rate compared to prior art couplings.

Another feature of the invention is to improve the reliability of a breakaway coupling by providing a coupling with few moving parts. The coupling may be reconnected by pushing the coupling halves together. According to one embodiment of the invention, the spiral ring may be easily replaced to alter the force required to separate the coupling halves.

It is an advantage of the present invention that the coupling is easy to manufacture. A significant advantage of the invention is the relatively low maintenance and service cost for the coupling, combined with its long life. The design of the present invention allows the coupling to be manufactured from various types of materials, and the operation of the coupling promotes its acceptance in the marketplace.

These and further objects, features and advantages of the present invention will become apparent from the following detailed description, wherein reference is made to the figures and the accompanying drawings.

BRIEF DESCRIPTION OF THE DRAWINGS

FIG. 5 is a detailed illustration of the spiral ring connecting the coupling halves, while

DETAILED DESCRIPTION OF PREFERRED EMBODIMENTS

Figure 1:
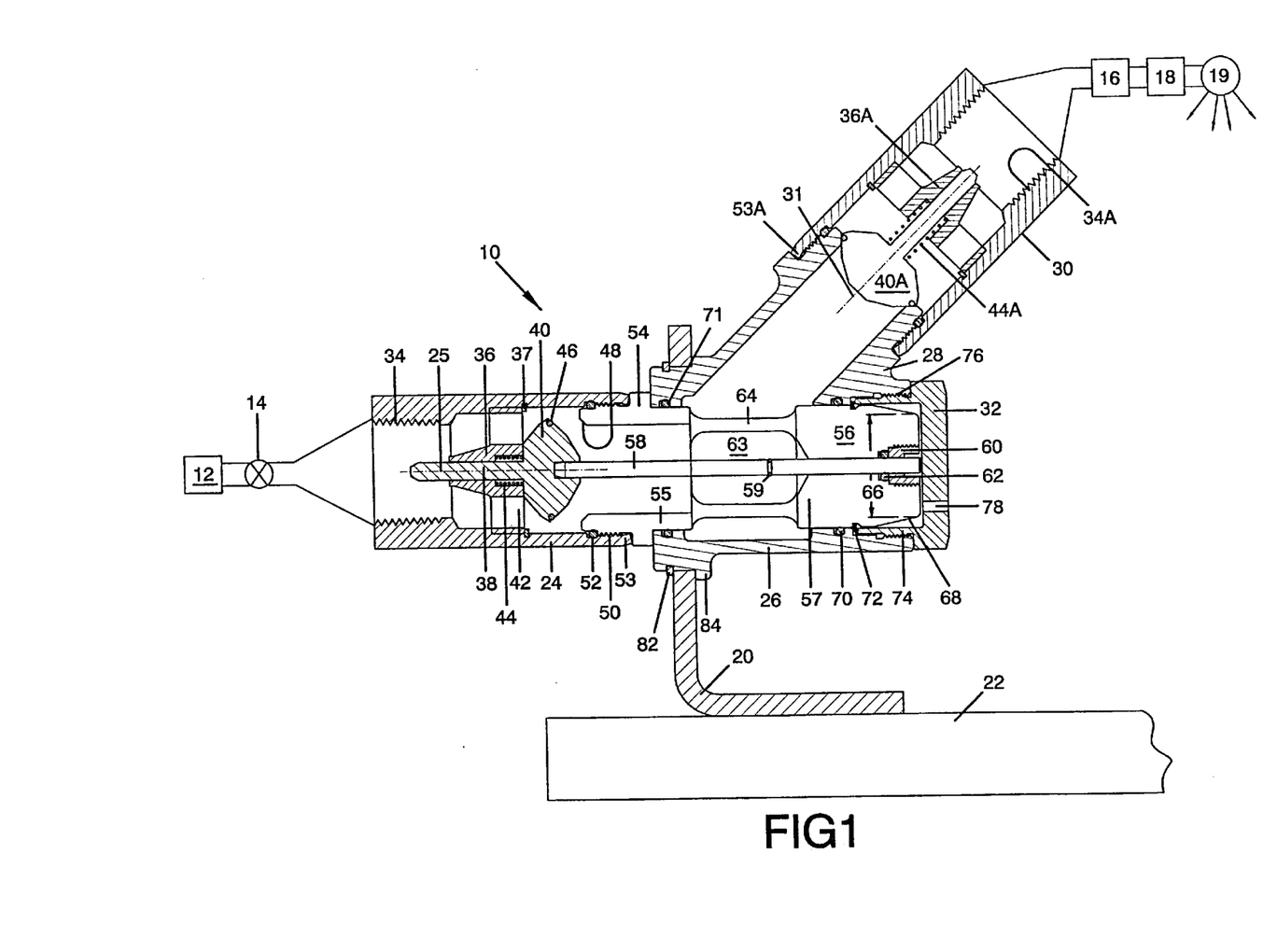
FIG. 1 is a pictorial view, partially in cross-section, of one embodiment of a coupling according to the present invention, with the application for the coupling being schematically illustrated.

FIG. 1 illustrates a suitable breakaway coupling 10 according to the present invention, and includes a schematic of representative components in a flow system in which the coupling may be used. As shown in FIG. 1, a nurse tank 12 includes a nurse tank hose valve 14 upstream of the coupling 10. A flow meter 16 and a hydraulic shutoff 18 are provided between the coupling and a distributor 19, which distributes anhydrous ammonia to the applicator typically associated with each knife of the field implement. The coupling 10 is commonly mounted on a tool bar 22, with a bracket 20 interconnecting the tool bar and the coupling. The flow of fluid through the coupling as shown in FIG. 1 is thus from the left side to the right side of the Figure. Flexible hoses are typically connected to the upstream and downstream ports of the coupling, and commonly have a inside diameter of either one inch or one and a quarter inch. The coupling is designed to comply with the American National Standard ANSI K 61.1 which requires the use of a breakaway coupling if an applicator tank is towed. The coupling may be intentionally disconnected for inspection. The coupling will be automatically disconnected during a breakaway when a high axial tensile force is transmitted along the nurse tank hose which is connected to the coupling. The coupling 10 will thus automatically disconnect prior to the hose being ruptured, e.g., the disconnect will breakaway if the hitch pin comes out since the nurse tank hose with the coupling is the only remaining connection between anhydrous ammonia applicator and the nurse tank.

The coupling 10 shown in FIG. 1 comprises a male plug housing 24 and a female plug housing 26, with the latter including a Y extension 28. The housing 24 has an upstream poppet 40 positioned therein; a downstream housing 30 connected with the Y extension 28 has a similar poppet 40A therein. An end cap 32 closes off the right side of the female housing 26. Each housing 24, 30 is provided with a suitable connector, such as threads 34, 34A, for connecting the upstream and downstream components of the housing with a respective end member (not shown) of a flexible flow line.

Figure 3:
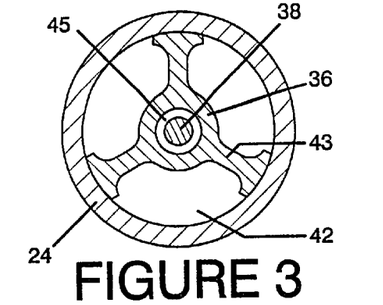
FIGS. 3 and 4 are cross-sections through respective portions of the coupling shown in FIG. 2.

A guide 36 is held in the male housing 24 by a snap ring 37. The guide 36 is provided with a plurality of circumferentially spaced flow ports 42 therein spaced between respective guide legs 43 (see FIG. 3), and a central passageway for receiving shaft portion 38 of poppet 40 which slides within the central passageway during opening and closing of the poppet 40. A coil spring 44 fits within pocket 45 of the guide 36 and biases the poppet 40 toward the closed position. The O-ring seal 46 is adapted to seal against conical seating surface 48 of the interior housing 56. Housing 56 in turn is fixedly connected to housing 24 by threads 50, and sealing engagement is provided by O-ring seal 52. Shoulder 54 of housing 56 engages the right-end of housing 24 and, after housing 24 and 56 are threaded together, the housings may be pinned or crimped, e.g., by annular crimp 53, so that these housings are permanently connected. The downstream housing 30 is provided with similar components which are numbered with corresponding numerals followed by the A designation. As shown in FIG. 1, the upstream poppet 40 is open and the downstream poppet 40A is closed.

Figure 4:
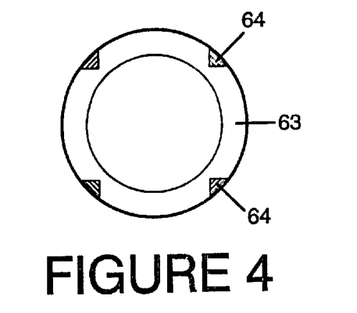

The upstream poppet 40 is maintained open while the coupling is mated by a push rod 58, which is biased by spring 44 for engagement with end plate or end cap 32. A push rod guide and stop 60 is threaded to the housing 56, and O-ring 62 maintains a seal between the housing 56 and the push rod 58. The housing 56 includes side flow channels 63 formed by four circumferentially spaced ribs 64 (see FIG. 4) which structurally interconnect upstream portion 55 with the downstream portion 57 of the interior housing 56. The channels 63 thus fluidly connect the interior of housing 24 with the interior of the Y extension 28. The downstream or nose end 57 of the housing 56 is sealed with the female housing 26 when the coupling 10 is mated by O-ring 70. A seal 71 similarly seals between the upstream end 55 of the housing 56 and the female housing 26.

The internal housing 56, and thus the male plug housing 24, is structurally interconnected with the female housing 26 when the coupling is mated by a spiral ring 72, which is discussed in detail subsequently. For the present, it should be understood that, when the coupling is mated, the spiral ring 72 is positioned axially between the extension 74 of the cap 32 and the stop surface 27 of the housing 26 (see FIG. 5), and is also positioned within an annular groove 86 in the internal housing 56 adjacent a frustroconical ramp surface 88 on the housing 56. Cap 32 is threaded to the female housing 26 by threads 76 on the cap extension 74. The cap 32 includes one or more vent ports 78 which is open to atmosphere. O-ring 59 provided in a groove in the push rod 58 prevents the push rod from dropping out through the stop 60 when the coupling is unmated (see FIG. 2).

The coupling 10 is thus physically supported on a bracket 20 in a mated position, and when in the unmated position the female housing 26 remains with the bracket 20. Suitable means, such as a C ring 82, may be used to retain the female housing 26 in engagement with the annular shoulder 84. If the female housing 26 needs to be replaced, the C ring 82 may be removed and the female housing slipped out of the hole provided in the bracket 20, and a new female housing then replaced and held in place by the snap ring 82.

Figure 2:
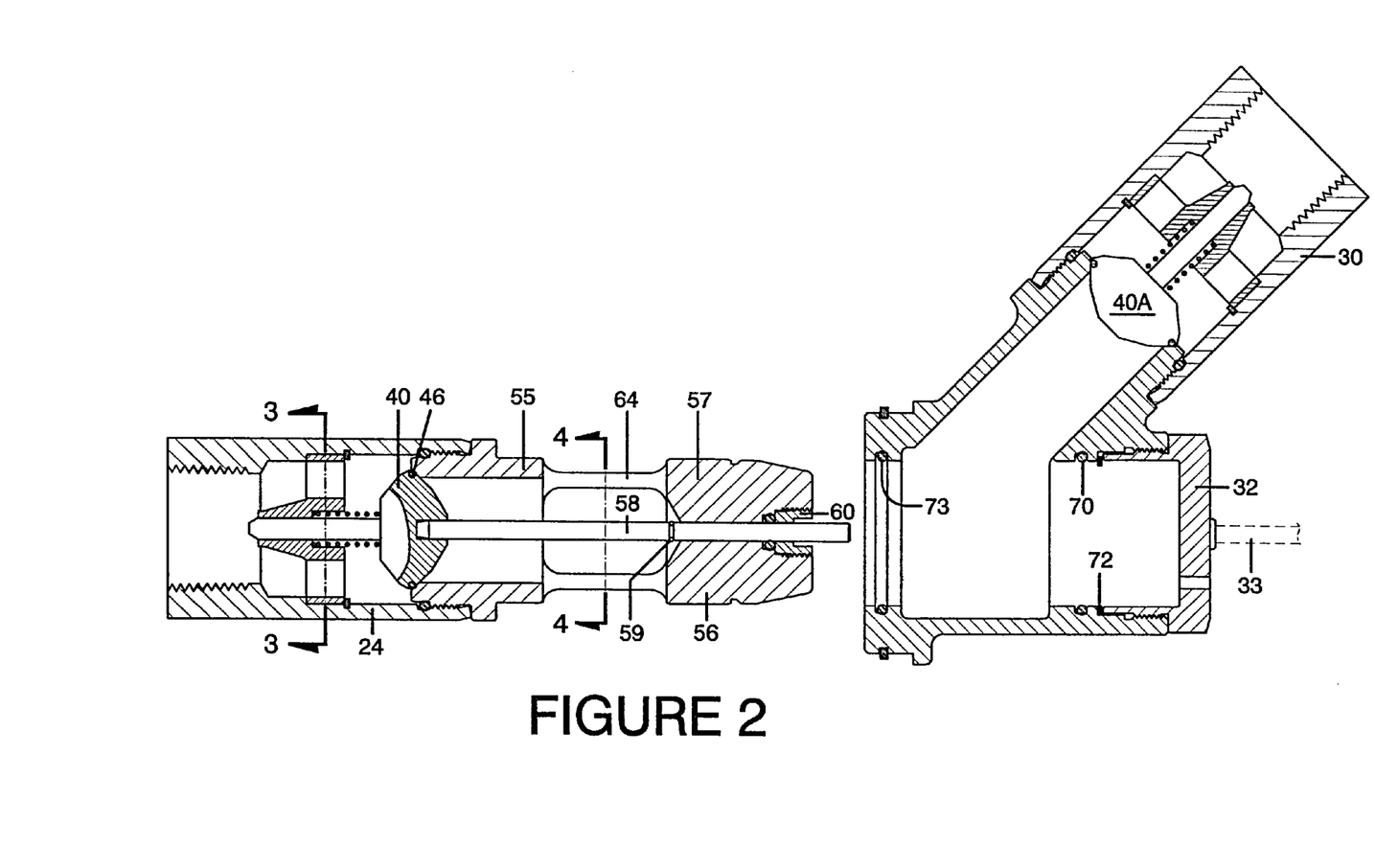
FIG. 2 is a cross-sectional view of the coupling shown in FIG. 1 in the disconnected position.

In operation, the coupling 10 normally transfers fluid from the nurse tank 12 to the meter 16. Pressurized fluid opens the poppet 40A, compressing the spring 44A. In response to a minor axial pull on the flexible flow line, the coupling will remain connected. A high axial force will, however, cause the metal spring 72 to effectively ride up the ramp surface 88 as it expands in diameter (see FIGS. 5 and 6). Once the spiral ring 72 slides up the ramp surface 88, the nose portion 57 will pull out from the female housing 26, causing the coupling to separate, as shown in FIG. 2. Immediately upon separation, the poppets 40, 40A will automatically close, thereby trapping fluid within both the upstream and downstream flexible flow lines.

Figure 5:
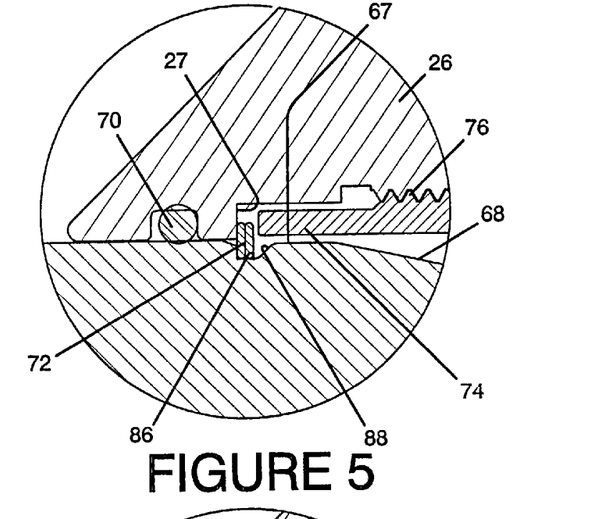
Figure 6:
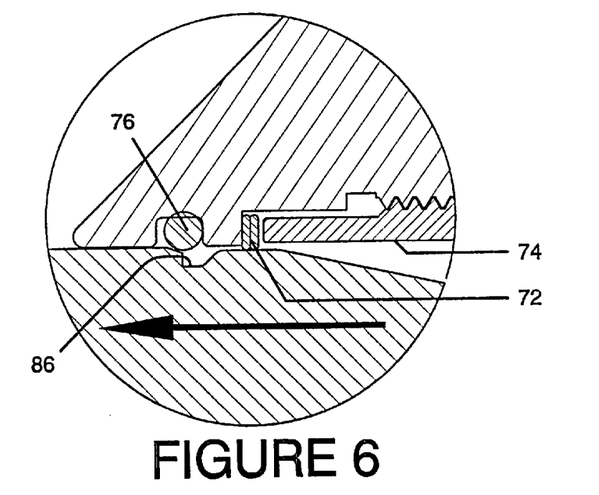
FIG. 6 is a detailed cross-section illustrating the coupling halves starting to disengage.

The spiral ring 72 is preferably fabricated from metal, such as spring steel. Only a few circumferential wraps of the spiral ring 72, e.g., between slightly less than one and 3 circumferential wraps, are necessary to achieve the desired objectives of the invention. The spring characteristics of the spiral ring 72, and in particular the characteristics which affect radial expansion of the spiral ring 72, may be matched with the angle of the ramp surface 88 to effectively control the axial pull on the coupling which will result in separation. It should thus be understood that with a conventional spring steel spiral ring and a ramp surface 88 within the range of from 30 degrees to 60 degrees with respect to the axis 25, and preferably with a ramp surface angle of about 45 degrees, a predetermined axial pull on the coupling will be necessary to cause separation. It is a particular feature of this invention that the axial pull required to cause separation is not a function of the fluid pressure within the coupling, and accordingly the required axial pull may be predetermined for a structure of each coupling and without regard to the fluid pressure in which the coupling is placed (luring its operation. The radially inwardmost surface of each spiral ring 72 wrap may be slightly rounded, as shown in FIGS. 5 and 6, to maintain smooth sliding engagement of the snap ring along the ramp surface 88.

One of the features of the present invention is that the coupling 10 may be reconnected without removing the end cap 32 and without replacing the spiral ring 72. Once the coupling separates, the spiral ring will drop within the groove 86, and accordingly the spiral ring 72 is no longer axially aligned with the axis 25 of the housing 24. The nose portion 57 of the internal housing 56 has a selected nose diameter 66 as shown in FIG. 1, with a low angle ramp surface 68 connecting the nose diameter 66 with the cylindrical surface 67 (see FIG. 5) which is spaced axially downstream from the groove 86. The nose diameter 66 is maintained sufficiently small to ensure that the ramp surface 68 will engage snap ring 72 even though it is not aligned with respect to the axis 25, so that the process of mating the coupling effectively causes the spiral ring 72 to become aligned with the axis 25 as it moves up the low angle ramp surface 68. The coupling 10 may thus be snapped together so that the ring 72 drops in the groove 86, and is then ready for use.

For the coupling as described in FIGS. 1–6, the axis 25 of the upstream housing 24 is offset at an angle of approximately 45 degrees with respect to the axis 31 of the downstream housing 30. The ring 72 is intended to cause separation upon a preselected force which is coaxial with the axis 25, i.e., when flexible hose interconnecting the valve 14 with the coupling 10 experiences an axial pull sufficient to cause separation. The bracket 20 allows for both up and down and sideways positioning of the female housing with respect to the tool bar, so that the male housing 24 may pivot into alignment with the upstream hose and the axial force in the hose will be aligned with male housing axis. If the bracket 20 were to directly support the male housing 24, a significantly higher axial pull on the downstream line interconnecting the coupling 10 with the meter 16 would be required to cause separation because of a binding action that such a force would cause between the male and female housings, and because that axial pull force is not coaxial with the axis 25 which is aligned with the axis of the ramp surface 88. If the male housing were supported rather than the female housing, cable 33 may be connected to the cap 32 as shown in dashed lines in FIG. 2, and tension in the cable 33 rather than the downstream flexible hose may be used to cause separation. For the embodiment shown in FIG. 1, the female housing 26 and thus the downstream housing 30 may be considered fixed, so that it is always the pull on the upstream flow line that determines separation. The coupling 10 may, however, be mounted in a different configuration for another application.

An advantage to the design described above is that the split ring 72 may be easily replaced to increase or decrease the axial force required to cause separation. If, for example, the coupling 10 is undesirably separating in response to an undesirably low axial pull on the flexible line interconnecting the valve 14 and the coupling 10, the coupling 10 may be intentionally separated as shown in FIG. 2, and the end cap 32 removed so that the split ring 72 may be replaced with a ring which will provide a higher resistance to radial expansion as it slides up the ramp surface 88.

Figure 7:
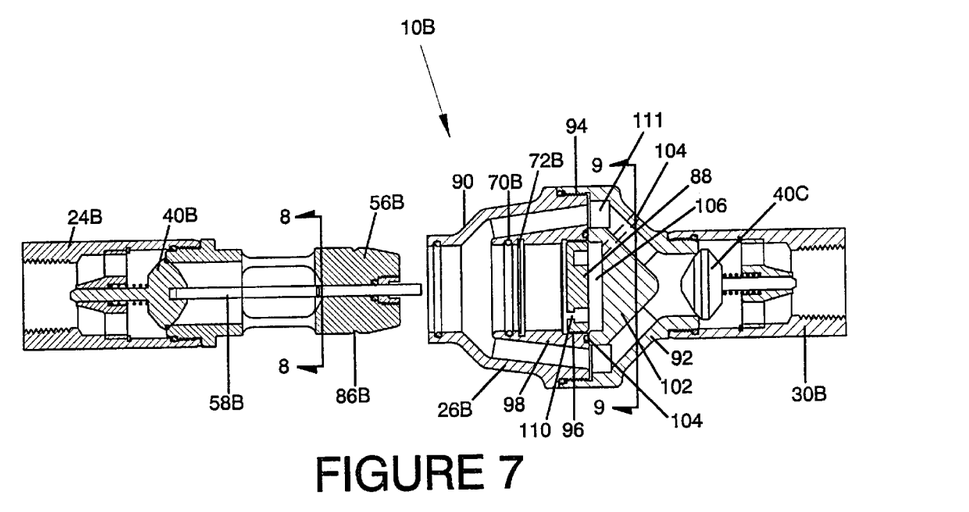
FIG. 7 is a cross-sectional view of another embodiment of a coupling according to the present invention in the disengaged position.

An alternate design for improved breakaway coupling 10B is illustrated in FIG. 7. The male housing 24B is structurally very similar to the male housing 24 previously described. The apparent difference between the previously described embodiment and the embodiment shown in FIG. 7 is that the axes of the male housing 24B and the downstream housing 30B are coaxial. Due to this in-line design, the embodiment as shown in FIG. 7 has a stop plate 88 which is internal of the female housing 26B, and replacement of both the o-ring 70B and the split ring 72B cannot be accomplished as easily as with the previously described embodiment. The poppets 40B and 40C perform in substantially the same manner as the poppets 40 and 40A previously described.

Figure 8:
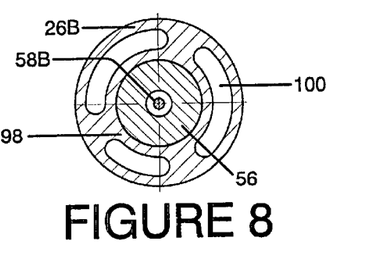
FIGS. 8 and 9 are cross-sectional views through respective portions of the coupling shown in FIG. 7, but illustrate these cross-sections when the coupling is mated rather than separated.
Figure 9:
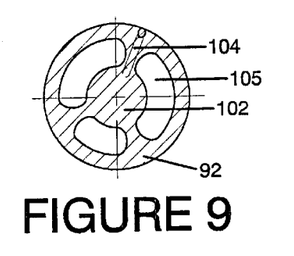

For the design as shown in FIG. 7, the female housing 26B comprises coupling housings 90 and 92, which are threaded together at 94. When mated, rod 58B presses against stop plate 88, which in turn is threaded at 96 to interior sleeve 98, which is preferably integral with housing 26B, as shown in FIG. 8. Internal sleeve 98 carries both the seal 70B and the snap ring 72B previously described. FIG. 8 illustrates the circumferential spacing of the flow ports 100 in the housing 26B for passage of fluid through the coupling 10B.

Interior member 102 of housing 92 engages interior sleeve 98 of housing 26B when the coupling 10B is mated. Sealing engagement of interior sleeve 98 and interior member 102 is provided by O-ring seal 104. Circumferential passageways 111 in housing 92 as shown in FIG. 7 provide fluid communication between the passageways 100 and passageway 105 in the downstream housing 92. One or more vent ports 110 in the stop plate 88 provide venting from the volume within the internal housing 56B through the stop plate 88 and into chamber 106 once the seal 70B seals with an exterior surface of the housing 56B. The vent port 104 in the housing 102 then interconnects the chamber 106 to atmosphere to provide pressure balancing of housing 56B.

Although two designs have been described in detail in accord with the present invention, various other designs for the improved breakaway coupling will be suggested by the foregoing description. Those skilled in the art will appreciate the components of the coupling may be manufactured from various types of materials. The particular design of the coupling will in part depend upon the application which the coupling is used. Although an improved breakaway coupling for the particular anhydrous ammonia application has been described in detail, those skilled in the art will also appreciate that the couplings described herein may be easily modified for other applications. Other suitable applications for such a breakaway coupling include use in flexible flow lines connected for transmitting propane or other potentially dangerous chemicals.

For the embodiment as shown in FIG. 7, the snap ring 72B is fitted within an annular groove in interior sleeve 98 of the female housing 26B. For the embodiment as shown in FIG. 1, an annular groove in the female housing 26 is effectively formed between the end wall 27 and the extension 74 of the end cap 32. In either case, the spiral ring is intended to slide up a ramp surface 86, 86B during unmating of the coupling.

For the embodiments as discussed herein, the spiral ring expands radially to remain in the respective groove in the female housing as the male housing is pulled axially from the female housing during separation of the coupling. In other embodiments, the ramp surface may be provided on the female housing so that the snap ring is radially compressed rather than radially expanded during axial separation of the coupling halves. Once the snap ring is sufficiently compressed to pass by the ramp surface on the female housing and allow separation of the coupling, the snap ring may then slide out with the male housing. The snap ring may then be radially compressed during mating of the coupling halves so that it will expand back into the larger diameter groove in the female housing during mating of the coupling.

Additional modifications and alterations to the embodiments and method described herein should be apparent to one skilled in the art from this description. Various modifications may be made in accordance with the teachings of the present invention, and the invention is thus not restricted to the preferred embodiments discussed herein and shown in the accompanying drawings. The scope of the invention should be understood to include all embodiments within the scope of the following claims.

What is claimed is:

1. An improved breakaway coupling for separation upon an axial force in at least one flow line fluidly connected to the coupling, comprising:

an upstream housing having an upstream poppet therein for sealing engagement with an upstream seating surface fixed with respect to the upstream housing;

an upstream biasing member for biasing the upstream poppet into sealing engagement with the upstream seating surface;

a downstream housing having a downstream poppet therein for sealing engagement with a downstream seating surface fixed within the downstream housing;

a downstream biasing member for biasing the downstream poppet toward the downstream seating surface;

first and second seals each carried on one of the upstream housing and the downstream housing for sealing engagement with a respective sealing surface on the other of the upstream housing and the downstream housing, the first and second seals having substantially equal sealing cross-sectional areas such that fluid pressure in the coupling does not affect separation;

a fluid flow passageway spaced axially between the first and second seals for fluidly interconnecting the upstream housing and the downstream housing;

a vent passageway in a female housing of the upstream housing and the downstream housing for maintaining atmospheric pressure on a respective one of the first and second seals when a male housing is positioned within the female housing;

each of the upstream housing and the downstream housing having a respective upstream housing annular groove and downstream housing annular groove therein, the upstream housing annular groove and downstream housing annular groove being axially aligned while the coupling is mated;

a ring positioned in both the upstream housing annular groove and downstream housing annular groove when the coupling is mated; and a disengaging ramp surface fixed to one of the upstream housing and the downstream housing and adjacent a respective annular groove, such that the ring is radially altered as the ring moves up the disengaging ramp surface and releases the upstream housing from the downstream housing in response to axial force on the at least one flow line.

2. The improved breakaway coupling as defined in claim 1, where the disengaging ramp surface is provided on the upstream housing and the disengaging ramp surface causes radial expansion of the spiral ring during axial separation of the coupling.

3. The improved breakaway coupling as defined in claim 1, further comprising:

a push rod positioned at least partially within the downstream housing for physically separating the upstream poppet from the upstream seating surface until the coupling is separated.

4. The improved breakaway coupling as defined in claim 3, further comprising:

an interior member within the downstream housing, the interior member and the downstream housing defining a plurality of circumferentially spaced passageways for transmitting fluid through the downstream housing; and the push rod engages the interior member when the coupling is mated.

5. The improved coupling as defined in claim 1, wherein a central axis of the downstream housing is angled with respect to a central axis of the upstream housing.

6. The improved breakaway coupling as defined in claim 1, wherein the upstream housing is a male housing and the downstream housing is a female housing, and at least a portion of the male housing fits within the female housing while the coupling is mated.

7. The improved breakaway housing as defined in claim 6, further comprising:

an interior member within the female housing, the interior member and the female housing defining a plurality of circumferentially spaced passageways for transmitting fluid through the female housing.

8. The improved breakaway coupling as defined in claim 1, wherein a central axis of the upstream housing is aligned with a central axis of the downstream housing.

9. The improved breakaway coupling as defined in claim 6, further comprising:

an interior sleeve within the male housing, the interior sleeve and the male housing defining a plurality of circumferentially spaced passageways for transmitting fluid thread through the male housing.

10. An improved breakaway coupling for separation upon an axial force in at least one flow line fluidly connected to the coupling, comprising:

a male housing having a first poppet therein for sealing engagement with a first seating surface fixed with respect to the male housing;

a first biasing member for biasing the first poppet into sealing engagement with the first seating surface;

a female housing having a second poppet therein for sealing engagement with a second seating surface fixed within the female housing;

a second biasing member for biasing the second poppet toward the second seating surface;

a fluid flow channel for fluidly interconnecting the male housing and the female housing;

first and second seals each carried on one of the male housing and the female housing for sealing engagement with respective sealing surface on the other of the male housing and the female housing, the channel being spaced between the first and second seals, the first and second seals having sealing cross-sectional areas sized such that fluid pressure in the coupling does not affect separation;

each of the male housing and the female housing having a respective male housing annular groove and female housing annular groove therein, the male housing annular groove and female housing annular groove being axially aligned while the coupling is mated;

a ring positioned in both the male housing annular groove and female housing annular groove when the coupling is mated;

a disengaging ramp surface fixed to the male housing adjacent the male housing annular groove, such that the ring is radially expanded as the ring moves up the ramp surface and releases the male housing from the female housing in response to axial force on the at least one flow line; and an engaging ramp surface fixed to one of the male housing and the female housing such that the ring is radially altered as the ring moves up the engaging ramp surface ti fit within the male housing annular grove and the female housing annular grove.

11. The improved breakaway coupling as defined in claim 10, further comprising:

a push rod positioned at least partially within the female housing for physically separating the upstream poppet from the first seating surface until the coupling is separated.

12. The improved coupling as defined in claim 10, wherein a central axis of the female housing is angled with respect to a central axis of the male housing.

13. The improved breakaway housing as defined in claim 10, further comprising:

an interior member within the female housing, the interior member and the female housing defining a plurality of circumferentially spaced passageways for transmitting fluid through the female housing; and a central axis of the male housing is aligned with a central axis of the female housing.

14. The improved breakaway coupling as defined in claim 10, wherein the female housing a vent passageway therein for fluid communication between an exterior of the female housing and one of the first and second seals when the female housing is in sealing engagement with the male housing.

15. An improved method of separating a breakaway coupling in response to an axial force in at least one flow line fluidly connected to the coupling, comprising:

providing an upstream housing having an upstream poppet therein for sealing engagement with an upstream seating surface fixed with respect to the upstream housing;

biasing the upstream poppet into sealing engagement with the upstream seating surface;

providing a downstream housing having a downstream poppet therein for sealing engagement with a downstream seating surface fixed within the downstream housing;

biasing the downstream poppet toward the downstream seating surface;

providing a respective upstream housing annular groove in the upstream housing and downstream housing annular groove in the downstream housing;

providing a first seal on one of the upstream housing and downstream housing;

providing a second seal axially spaced from the first seal on one of the upstream housing and downstream housing;

providing a flow passage fluidly interconnecting the upstream housing and the downstream housing axially between the first and second seals;

providing a vent passageway in a female housing of the upstream housing and the downstream housing for maintaining atmospheric pressure on a respective one of the first and second seals when a male housing is fitted within the female housing;

positioning the upstream housing annular groove and downstream housing annular groove such that the grooves are aligned while the coupling is mated;

positioning a spiral ring in both the upstream housing annular groove and downstream housing annular groove when the coupling is mated;

providing a ramp surface fixed to one of the upstream housing and the downstream housing and adjacent a respective annular groove; and radially altering the spiral ring as it moves up the ramp surface to release the upstream housing from the downstream housing in response to axial force on the at least one flow line.

16. The method as defined in claim 15, further comprising:

positioning a push rod at least partially within the downstream housing for physically separating the upstream poppet from the upstream seating surface until the coupling is separated.

17. The method as defined in claim 15, wherein the upstream housing and the downstream housing are mated without replacing the spiral ring.

18. An improved breakaway coupling as defined in claim 1, further comprising:

an engaging ramp surface on a male housing such that the ring is radially altered as the ring moves up the engaging ramp surface when the male housing and the female housing are mated.

19. An improved breakaway coupling as defined in claim 10, further comprising:

a fluid flow passageway spaced axially between the first and second seals for fluidly interconnecting the male housing and the female housing when the coupling is mated.

20. The method as defined in claim 15, further comprising:

providing an engaging ramp surface on a male housing of the upstream housing and the downstream housing for radially altering the ring as it moves up the engaging ramp surface to fit within the upstream housing annular grove and the downstream housing annular grove.

* * * * *